United States Patent [19]

Böhm et al.

[11] Patent Number: 4,738,482
[45] Date of Patent: Apr. 19, 1988

[54] RIGID LID FOR AN AUTOMOBILE ROOF

[75] Inventors: Horst Böhm, Frankfurt; Rainer Grimm, Wetzlar, both of Fed. Rep. of Germany

[73] Assignee: Rockwell-Golde G.m.b.H., Fed. Rep. of Germany

[21] Appl. No.: 23,341

[22] Filed: Mar. 9, 1987

Related U.S. Application Data

[63] Continuation of Ser. No. 799,705, Nov. 19, 1985, abandoned.

[30] Foreign Application Priority Data

Feb. 21, 1985 [DE] Fed. Rep. of Germany ....... 3506009

[51] Int. Cl.$^4$ ............................. B60J 7/00; B60J 7/195
[52] U.S. Cl. ...................................... 296/216; 296/201; 296/84 D; 49/501
[58] Field of Search ............... 296/201, 840, 216, 218, 296/221, 222; 49/488, 501, DIG. 2; 425/123

[56] References Cited

U.S. PATENT DOCUMENTS

| | | | |
|---|---|---|---|
| 3,680,903 | 8/1972 | Hulten | 293/142 |
| 4,312,534 | 1/1982 | Jaroin et al. | 296/216 |
| 4,375,899 | 3/1983 | Kajiyama et al. | 296/216 |
| 4,466,657 | 8/1984 | Kaltz et al. | 296/222 |
| 4,509,791 | 4/1985 | Bienert et al. | 296/216 |
| 4,553,307 | 11/1985 | Kaltz et al. | 296/216 |

FOREIGN PATENT DOCUMENTS

| | | | |
|---|---|---|---|
| 8304234 | 7/1985 | Netherlands | 296/216 |
| 2106050 | 4/1983 | United Kingdom | 296/218 |

*Primary Examiner*—Dennis H. Pedder

[57] ABSTRACT

In a rigid lid, associated with the roof opening of an automobile roof surface, in order to achieve low manufacturing tolerances at the lid external dimensions and to simplify manufacture of the lid, the lid plate and the reinforcing frame fitted below it have injection moulded around them a single-piece, peripheral plastics frame, which additionally constitutes an upper bordering frame and carries integrally formed fixing elements for an edge gap sealing member.

2 Claims, 2 Drawing Sheets

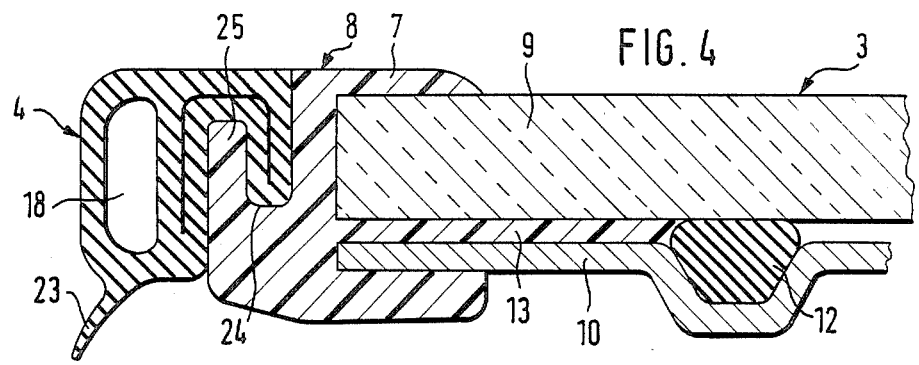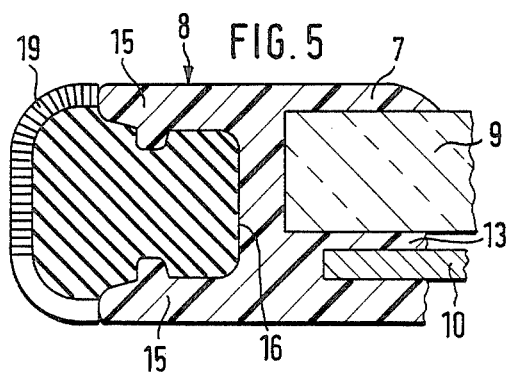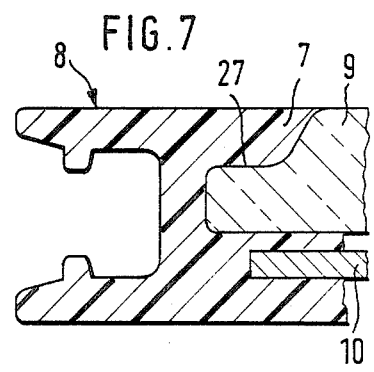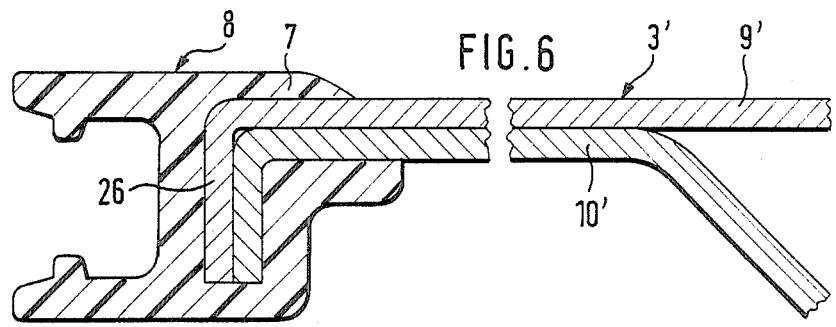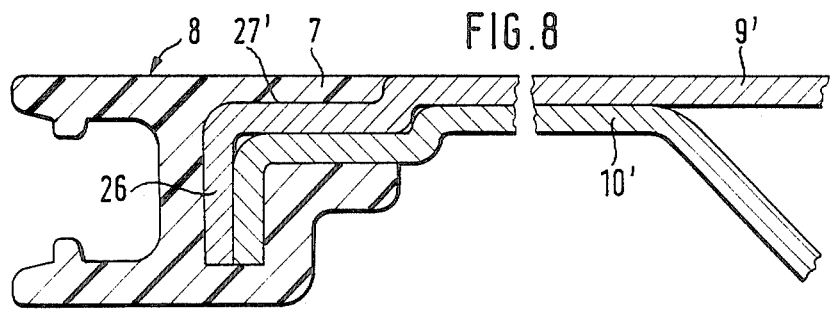

RIGID LID FOR AN AUTOMOBILE ROOF

This is a continuation of application Ser. No. 799,705, filed Nov. 19, 1985, now abandoned.

FIELD OF INVENTION

This invention relates to a rigid lid for an automobile roof, which lid, in its closed position, fills a roof opening with all-round sealing and may be displaceable out of this opening to expose the opening at least partly, comprising a lid plate, a reinforcing frame supporting the lid plate from below in its edge region, an upper bordering frame bearing against the upper face of the lid plate and connected with the reinforcing frame, and an edge gap sealing profile member fitted all around the lid periphery. The term "automobile roof" is intended to encompass all constructions which, according to the movement characteristic of the rigid lid associated with the roof opening, are termed sliding roofs, lifting roofs, (so-called ventilator flaps), sliding lifting roofs and upper ridge sliding roofs.

PRIOR ART

For roofs of this kind, translucent plastics materials or glass or steel sheet are usual as the material for the lid plate, whereas the reinforcing frame of the lid, to which the elements necessary for actuating and guiding movement of the rigid lid are fixed, in general is pressed in one piece from steel sheet.

The edge gap sealing profile member which assures a watertight seal of the rigid lid against the edge of the roof opening when the automobile roof is closed is, in known arrangements, usually pushed from below onto a downwardly directed, peripheral edge of the lid after the lid plate has been connected to the reinforcing frame.

In the manufacture of the rigid lid, it is of extreme importance that the manufacturing tolerances of the lid external dimensions shall be as small as possible, because the lid if over-dimensioned jams in the roof opening and if under-dimensioned is not satisfactorily sealed by the edge gap seal. Whereas, in lids of steel, the manufacturing tolerances can, as a rule, be kept within relatively narrow limits, in the case of glass lids dimensions outside the tolerances of the order of several millimetres frequently occur at the lid plate due to variations in manufacture and material, and these excessive tolerances can no longer be compensated by the elastic edge gap seal, especially also since further tolerance deviations to the lid external dimensions can occur due to the edge gap seal itself and its fitting by hand.

Especially in the case of glass lids, problems arise from the usual method of bonding of the reinforcing frame to the lid plate, because due to different coefficients of expansion of the glass and of the steel sheet the bonding points are highly loaded. Furthermore, the adhesive used for bonding requires long hardening times, which furthermore are lengthened due to the lack of air exchange at the adhesive position as a consequence of the edge gap seal fitted around the periphery.

In a rigid lid corresponding to the type first mentioned above, for example as described in German Offenlegunsschrift 3041505, comprising a lid plate of translucent material, the lower reinforcing frame and the upper bordering frame are rigidly connected together by caulking and clamp the edge of the lid plate between them, which is intended to give to the rigid lid increased stability.

Due to the construction of the two frames engaging the one into the other and the manufacture of the upper bordering frame as a light metal extruded profile, the upper bordering frame is divided at least into two in the peripheral direction, so that during assembly several frame components have to be connected together. The known lid therefore requires considerable work in assembly, especially since the lid plate must also be sealed to the multi-part frame by a sealing compound. Due to the fact that the upper bordering frame, composed of several parts, externally surrounds the lower reinforcing frame, in this known lid construction larger manufacturing tolerances in the external dimensions of the lid cannot be eliminated. The joint positions between the frame parts of the upper bordering frame can also be a cause of water penetrating, by capillary action or opening out due to temperature distortion, into the interior of the lid and leading to corrosion of the metal parts.

SUMMARY OF INVENTION

The present invention is intended to provide a rigid lid which, while avoiding or reducing the above-described disadvantages, can be made with low manufacturing tolerances in a simple manner.

According to the invention, there is provided a rigid lid for an opening in an automobile roof, the lid comprising a lid plate, a reinforcing frame supporting the lid plate from below in its edge region, an upper bordering frame bearing upon the upper surface of the lid plate and connected to the reinforcing frame, and a peripheral edge gap sealing member, the upper bordering frame comprising a one-piece injection moulded plastics frame applied to and surrounding the whole periphery of the lid plate and reinforcing frame, the plastics frame extending over the edge regions of the lid plate and of the reinforcing frame, and the plastics frame comprising integral peripheral fixing elements for fixing the edge gap sealing member thereto.

Injection moulding of the plastics frame around the periphery of lid plate and reinforcing frame using a suitable plastics material, for example a plasticized polyvinyl chloride, allows extremely low manufacturing tolerances in the external dimensions of the lid to be achieved, as the dimensions of the plastics frame are virtually a function only of the constant dimensions of the injection mould. External dimensional deviations of the lid plate, such as occur particularly in glass lids, are immediately compensated in the all-round injection moulding and do not have an adverse effect upon the external dimensions of the finished lid. Since the plastics frame injected all around is in one piece and sealingly adjoins the lid plate on all sides, a very good sealing effect is attained without additional sealing compound. The lid can be manufactured simply and without complicated and expensive manual operations in large numbers in a production run and to constant external dimensions. As a result of the fixing elements for the edge gap sealing member being integrally formed at the same time as the peripheral injection moulding operation for the frame, this sealing member can be easily and reliably fitted. Gluing together of the lid components is not necessary.

In an advantageous embodiment between the lid plate consisting in known manner of a translucent or transparent material and the reinforcing frame, a band comprising a cord or the like is laid to extend uninterruptedly around these components and holds them apart, the band forming the inner boundary of the plastics layer which penetrates during the peripheral injection moulding operation between lid plate and reinforcing frame. The translucent or transparent lid formed in this way is of simple construction and is especially stable, because the reinforcing frame is united with the lid plate virtually as one component by the injection moulding with plastics material.

In this embodiment it is advantageous if the band is laid in a groove-shaped depression of the reinforcing frame. In this manner the production of the lid is still further simplified, the position of the band and thus the position of the boundary for the plastics layer which penetrates during the injection moulding between lid plate and reinforcing frame being exactly determined by the depression.

The invention is not limited to a lid comprising a lid plate of translucent or transparent material. The lid construction of the invention can also be used with advantage when the lid plate is formed, in known manner, from a metal sheet.

In the lid of this invention the lid plate, regardless of whether it is formed from translucent or transparent material or metal, and the reinforcing frame may be firmly held together exclusively by the plastics frame injection moulded around them. No additional fixing means are generally required for holding the lid plate and reinforcing frame together. If, in the case of a lid plate of metal, an additional connection between reinforcing frame and lid plate is required then these two components can be connected to one another in a simple manner in their horizontal region by spot welding; in the peripheral injection moulding operation the spot welds can be covered by the upper bordering frame.

Instead of a cord between lid plate and reinforcing frame, a plastics bead applied endlessly onto the reinforcing frame may also be used, the lid plate being laid upon this bead.

The fixing elements for the edge gap sealing member integrally formed on the single-piece plastics frame may advantageously be constructed as an outwardly open groove or the like, into which the edge gap sealing member is inserted, to project outwards beyond the plastics frame.

The lid may also be so constructed that an edge gap sealing member of a different material is injection moulded onto the single-piece plastics frame. The moulding of the edge gap sealing member may be done in the same mould as that in which the plastics frame is moulded.

The lid plate may be furnished with a peripheral shoulder or the like, on its upper surface, into which the plastics frame extends to form an upper bordering frame flush with the upper surface of the lid plate. In this embodiment, the plastics frame lies flush with the upper surface of the lid, so that a smooth external surface of the lid is obtained.

DESCRIPTION OF DRAWINGS

Lids for automobile roofs according to embodiments of the invention will now be described by way of example with reference to the accompanying drawings in which:

FIGS. 3 to 5 are sections similar to FIG. 2, which illustrate modified forms of the plastics frame;

FIG. 6 is a section corresponding to section II—II in FIG. 1, but through a steel lid;

FIG. 7 is a further cut-away section through the edge zone of a glass lid furnished with an edge step and FIG. 8 is a section similar to FIG. 7 through the edge zone of a steel lid furnished with an edge step.

DESCRIPTION OF PARTICULAR EMBODIMENTS

Figure 1:
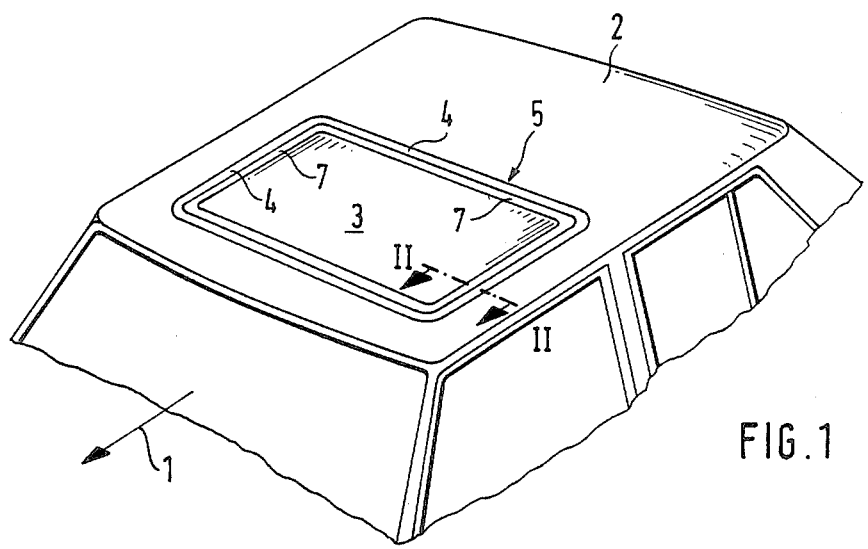
FIG. 1 is a cut-away, perspective view of an automobile roof with a rigid lid shown in the closed position.

In the drawings, embodiments of the rigid lid are shown schematically, the sectional views according to FIGS. 2 to 8 being to a larger scale than actual. In FIGS. 6 to 8, the edge gap sealing member has not been shown, for simplicity. Corresponding components have the same reference numerals in the drawings.

The automobile roof shown in FIG. 1 belongs to a passenger-carrying automobile vehicle, the forward travel direction of which is indicated by the arrow 1. In the front region, with respect to forward travel, of the fixed roof surface 2 of the automobile roof, there is a roof opening 5, in which the rigid lid 3 shown in the closed position is situated. The lid 3 is sealed against the perpendicular edge trim 6 (FIG. 2) of the fixed roof surface 2 by the edge gap sealing profile member 4. In FIG. 1 there can also be seen an upper bordering frame 7 which is an integral component of the plastics frame 8, as described below.

Figure 2:
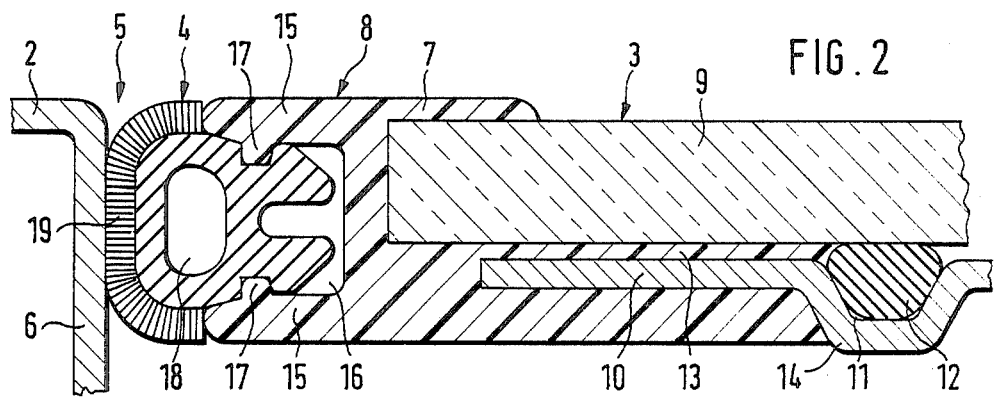
FIG. 2 is a cut-away section along II—II in FIG. 1 through an automobile roof with a glass lid.

In the embodiment illustrated by FIG. 2, the plate 9 of the lid is of glass or a transparent plastics. The same is true for the embodiments shown in FIGS. 3 to 5 and 7.

Below the lid plate 9 is situated the reinforcing frame 10, formed from steel sheet, which supports the lid plate from below in its edge region, the external dimensions of the frame being approximately the same as those of the lid plate 9. The actuating and guide elements (not shown) for raising and lowering the lid act on the reinforcing frame 10.

In the reinforcing frame 10, there is a peripheral, impressed, groove-like depression 11, in which is deposited a continuous peripheral band 12 which in the unloaded state may have a circular cross-section. The band 12 is "endless" and may be adhesive when applied to the reinforcing frame in order to secure the lid plate thereto and also to secure the band in the groove provided in the frame. In FIG. 2 and also in FIGS. 3 and 4, the band is illustrated in its deformed, loaded state, which is produced partly by the weight of the lid plate 9 placed on it and partly by the injection tool. The deformed band 12 holds the lid plate 9 and reinforcing frame 10 at a constant spacing from each other all around their periphery.

In all the embodiments shown the lid plate 9 and reinforcing frame 10 are firmly embedded, in their edge zones, in the plastics frame 8, which is applied by injection moulding around these components. The lid plate and the reinforcing frame can be held together exclusively by plastic frame. In the injection moulding operation, the molten plastics material penetrates also into the gap between the lower face of the lid plate 9 and the upper face of the reinforcing frame 10 and forms there a plastics layer 13, which is bounded on the inner side by the band 12. This contributes to a firm connection between lid plate 9, reinforcing frame 10 and plastics frame 8. Moreover, the associated region of the reinforcing frame 10 is covered on the outside by the plastics layer 13, so that this region of the reinforcing frame 10 cannot be seen from above through the lid plate 9.

The plastics frame 8 constitutes the upper bordering frame 7, visible from outside, which partly fits over the lid plate 9. Beneath, the plastics frame 8 partly covers the lower face of the reinforcing frame 10, the plastics frame 8 in the embodiment of FIG. 2 being bounded on the inside by a peripheral rib 14 of the reinforcing frame 10. The rib 14 is produced by pressing the groove-shaped depression 11 into the reinforcing frame 10. In the embodiments according to FIGS. 3 and 4, the plastics frame 8 terminates before the rib 14, but in these embodiments also it could continue as far as the rib 14. The same applies to the embodiments according to FIGS. 5 and 7.

A more detailed description of the injection moulds to be used for injection moulding around the lid plate 9 and reinforcing frame 10 will not be given as much injection moulds are well known. The lid plate 9 and reinforcing frame 10 are, of course, placed in an accurately defined position relative to each other and to the adjacent surfaces of the mould when in the mould.

In the injection moulding operation, the fixing elements for the edge gap sealing profile member 4 are integrally formed onto the external periphery of the plastics frame 8, which elements in the embodiment of FIG. 2 consist of two flange strips 15, extending generally horizontally and outwards. The upper flange strip 15 is, with its upper external surface, a component of the upper bordering frame 7, whereas the lower flange strip 15 lies with its lower surface flush with the entire lower surface of the plastics frame 8. The two flange strips 15 bound at the top and bottom, peripheral to space 16, open towards the side, into which the edge gap sealing profile member 4 is pushed. The edge gap sealing profile member 4 is held firmly to the plastics frame 8 by detent ribs 17, formed on the inner faces of the flange strips 15, which engage into corresponding detent grooves of the edge gap sealing profile member. In the embodiment according to FIG. 2, the edge gap sealing profile member 4 possesses, for the purpose of increasing its deformability, an air chamber 18 and carries, on its externally situated surface, a brush-like layer of flakes 19. The mode of fixing the edge gap sealing profile member 4, illustrated in FIG. 2, by laterally pushing it onto the rigid lid 3, offers the advantage that the edge gap sealing profile member 4 remains securely in its position anchored in the profile space 16 of the plastics frame 8, if vertical relative displacements occur between lid 3 and vertical edge trim 6.

Figure 3:
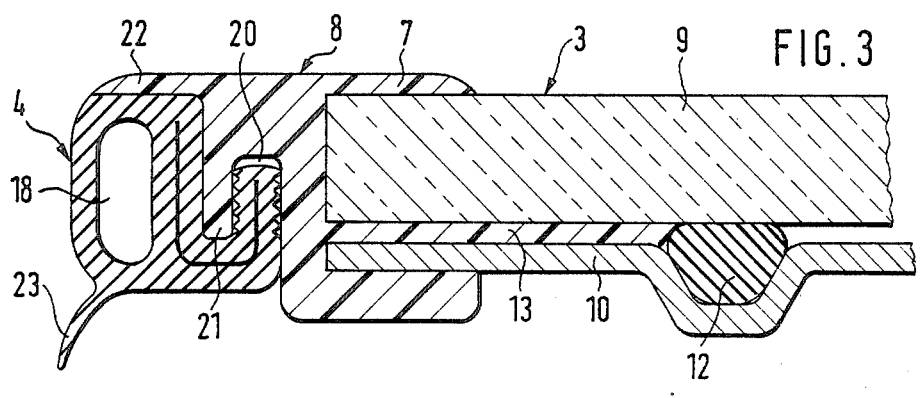

The embodiments shown in FIGS. 3 and 4 differ from that of FIG. 2 basically by fixing elements for the edge gap sealing profile member 4 which are fitted differently to the plastics frame 8. In FIG. 3, the plastics frame is designed for the edge gap sealing profile member 4 to be pushed on from below, whereas in the case of the plastics frame shown in FIG. 4, the edge gap sealing profile member is pushed on from above. For this purpose, there is provided in the plastics frame 8 according to FIG. 3 a downwardly open seating channel 20, the outer side wall of which constitutes a downwardly oriented fixing strip 21. The edge gap sealing profile member 4, here again provided with an air chamber 18 to increase its elastic deformability, possesses in its fixing zone facing towards the plastics frame 8 a substantially U-shaped cross-section, the inner arm or flange of which engages into the seating channel 20 and the outer arm of which bears from the outside against the fixing strip 21. The upper face of the edge gap sealing profile member bears against the lower face of a horizontal projection of the upper bordering frame. Also, in this embodiment, the edge gap sealing profile member is additionally equipped with an outwardly, downwardly oriented sealing lip 23. The dimensions of the edge gap sealing profile member are, of course, so adapted to the dimensions of the plastics frame, especially in the region of the seating channel 20 and fixing strip 21, that the profile member after being pushed onto the frame remains firmly seated.

In FIG. 4, the plastics frame 8 is furnished with an upwardly open seating channel 24, the outer wall of which is formed by a similar upwardly oriented fixing strip 25. The edge gap sealing profile member 4 possesses, in its fixing zone, here again a substantially U-shaped cross-section, which is so adapted in its dimensions to the seating channel 24 and the fixing strip 25 that the profile member remains firmly fixed on the plastics frame after being pushed on from above. For this purpose, the seating channel 24 may be back-cut but this is not shown in the drawings. The upper surface of the edge gap sealing profile member 4 is aligned with that of the upper bordering frame 7. In this case also, the edge gap sealing profile member possesses an air chamber 18 and a sealing lip 23.

In the embodiments of the rigid lid so far described, the edge gap sealing profile member 4 is always fixed by pushing onto the plastics frame 8. The fitting of the edge gap sealing profile member can, however, also be carried out by injecting it onto the plastics frame 8. This is illustrated in FIG. 5 which shows an embodiment similar to that of FIG. 2. Here the injected-on material of the edge gap sealing profile member entirely fills the profile cavity 16. The material used for injecting-on the edge gap sealing profile member is advantageously an elastic, closed-cell plastics foam, which possesses adequate elastic deformability. On its external surface, the injected edge gap sealing profile member again may be furnished with a brush-like layer of flakes 19. The injection of the edge gap sealing profile member may be carried out directly after the injection moulding of the plastics frame 8. The embodiments of the plastics frame 8 shown in FIGS. 3 and 4 are also suitable for forming the edge gap sealing profile member by moulding it onto the frame. In the embodiment of the rigid lid 3' shown in FIG. 6, the lid plate 9' is of steel sheet, which is furnished with a bent down edge flange 26. The reinforcing frame 10' bears, in the manner usual for sheet metal lids, directly against the lower face of the lid plate 9' and the inner face of the edge flange 26. The downward flange of the reinforcing frame 10', corresponding to the downward flange 26, may be dispensed with. In each case the edge regions of lid plate 9' and reinforcing frame 10' are firmly embedded in the moulded plastics frame 8. As in the embodiments already described, the firm connection of lid plate and reinforcing frame may be assured exclusively by the plastics frame 8. If desired, the lid plate 9' and reinforcing frame 10' can, of course, be connected together by spot welding before injection of the frame, in the horizontal region of these two parts, provided this region is covered over, at least from above, by the upper bordering frame 7, which overlaps the edge region of the lid plate 9'. The fixing elements for the edge gap sealing profile correspond in FIG. 6 and also in FIGS. 7 and 8, described below, to those of FIGS. 2 and 5.

In FIGS. 7 and 8, embodiments are shown, in which the upper surfaces of the bordering frame 7 are flush with the upper surface of the lid plate 9, 9' respectively. For this purpose, in the embodiment according to FIG. 7, in which a lid plate 9 of plastics or glass is used, this lid plate is furnished with a peripheral edge step 27, extending all round and starting from its upper surface, which becomes embedded into the plastics frame 8 when the latter is moulded on, so that there is no need for an additional overlap of the upper surface of the lid plate 9 by the upper bordering frame 7.

FIG. 8 illustrates a correspondingly formed sheet metal lid. Here, the lid plate 9', of steel sheet, is likewise furnished with a peripheral edge step 27', departing from the upper face of the lid plate, which is embedded in the manner already described with reference to FIG. 7 in the plastics frame 8. In other aspects, the form of the rigid lid according to FIG. 8 is approximately the same as that of FIG. 6. The reinforcing frame 10' can, as shown in FIG. 8, likewise be stepped to follow the contour of the lid plate 9'.

In the contect of the present invention, numerous modifications are possible for the form of the plastics frame 8 and its integrally formed fixing elements for the edge gap sealing profile member, both the lid plate and also the reinforcing frame being encompassed at their edge regions during the peripheral moulding operation, so that they constitute one unit with the plastics frame injection moulded onto them.

What we claim is:

1. A rigid lid for an opening in an automobile roof comprising:

a lid plate having upper and lower faces;

a reinforcing frame having upper and lower surfaces and supporting said lid plate from below in an edge region of the lid plate;

a gap between the lower face of the lid plate and the upper surface of the reinforcing frame adapted to receive a sealant material in the form of a band;

a sealant material in said gap in the form of a continuous band;

a plastic frame surrounding said reinforcing frame adjacent an outer side of said band;

said reinforcing frame having a peripheral groove-like depression for holding said sealant material in the form of said band adjacent said plastic layer and said reinforcing frame terminating at an outer edge below said lower face of said lid plate;

an edge gap sealing profile member fixed to said plastic frame;

sand band of sealant material holding said lid plate at a constant spacing from said reinforcing frame at the periphery of said frame;

said frame extending over said upper face;

said plastic frame being located between said lid plate and reinforcing frame in said gap which is bounded on an inner side thereof by said continuous band of sealant material and said plastic frame firmly connecting said lid plate, and said reinforcing frame; and integral peripheral fixing elements formed on the external periphery of said plastic frame for fixing said plastic frame to said edge gap sealing profile member.

2. A lid according to claim 1, in which the upper face of the lid plate is provided with a peripheral edge shoulder into which the plastic frame extends in order to form an upper bordering frame flush with the upper face of the lid plate.

* * * * *